United States Patent Office 3,492,159
Patented Jan. 27, 1970

3,492,159
WATER CONDITIONING
Duane D. Nowlin, St. Paul, Minn., assignor to Economics Laboratory, Inc., St. Paul, Minn., a corporation of Delaware
No Drawing. Filed Oct. 18, 1968, Ser. No. 768,917
Int. Cl. B08b 3/00
U.S. Cl. 134—10          2 Claims

ABSTRACT OF THE DISCLOSURE

Treating water with certain weak acid cation exchange resins to improve the suitability of water for dishwashing and other uses.

---

This invention relates to the treatment of water. One specific embodiment of the invention relates to the treatment of water which is employed for washing dishes, glasses and eating utensils.

Dishwashing results are influenced by several factors, including the type and nature of the food soil, the temperature and pressure employed in the wash cycle, the temperature and pressure employed in the rinse cycle, the type of dishwashing detergent employed, and last but not least, the quality of the water employed.

In hard water areas, that is where water contains substantial amounts of dissolved minerals, namely calcium and magnesium, good dishwashing results are not easily obtained. For example, unsightly spots and films develop on the surface of glassware; this phenomenon being commonly referred to as "water spotting." It is believed to be due in part to the minerals in the water drying on the glasses. The problem can be solved to some extent by adding a wetting agent to the rinse water, but this expedient does not completely eliminate spotting and filming. In areas where the water supply is particularly hard there is some benefit achieved by using softened water for dishwashing operations. Water softening is, of course, well known. In a conventional water softening process raw or hard water is generally passed through a column containing an ion exchange resin in the sodium form. The hardness minerals, calcium and magnesium, are removed from the raw water and are replaced by sodium ions. This reaction can be represented by the following equation:

$$M^{+2}X_2^- + Na_2R \rightarrow MR + 2Na^+X^-$$

wherein $M^{+2}X_2^-$ represents an ionizable salt of calcium or magnesium (M) and $Na_2R$ is the sodium salt of an ion exchange resin. Removal of calcium and magnesium ions from water is desirable for several reasons since these ions can react with soap to form a soap curd and thereby reduce cleaning efficiency. Also, the calcium and magnesium ions can react with carbonate or bicarbonate ions in the water to form a hardness scale on dishwashing equipment and on glassware. Water softeners are simple and easy to operate and relatively easy to maintain since they require only sodium chloride as a regenerant. Although conventional water softening processes remove the hard calcium and magnesium minerals from water, they do not reduce the total dissolved solids content (TDS). In fact, such processes slightly increase the dissolved solids content of water because two sodium ions are added for each calcium or magnesium ion that is removed.

Moreover, with the use of soft water in dishwashing a phenomenon known as "etching" is encountered. Etching is believed to be due to the action of phosphates usually present in dishwashing detergents upon metal ions in glassware with the glassware being gradually dissolved by the water. The etching problem can be eliminated to some extent by adding a little hardness to the water or by eliminating phosphates from the detergent. The first method is usually more practical.

In addition to merely softening water, i.e. removing calcium and magnesium ions therefrom, water which is employed in dishwashing can also be conditioned by deionization processes. Although deionization is somewhat related to simple water softening, it is considerably more complex. In deionization of water, all ionized substances are removed from the water instead of just exchanging calcium and magnesium ions for sodium ions as is accomplished by simple water softening processes. Deionization involves treating water with both a cation exchange resin and an anion exchange resin. The chemical reactions involved in deionization can be represented by the following equations:

$$M^+X^- + HR \rightarrow MR + H^+X^- \qquad (1)$$

$$H^+X^- + ROH \rightarrow RX + H_2O \qquad (2)$$

wherein $M^+X^-$ represents any ionizable metal salt, HR is the hydrogen form of a cation exchange resin and ROH is the hydroxide form of an anion exchange resin.

In deionization all metallic cations are removed from solution by the hydrogen form of the cation resin and all anions are removed by the hydroxide form of the anion exchange resin. The hydrogen and hydroxide ions produced by these two reactions combine to form pure water comparable to distilled water. Since deionized water contains no calcium or magnesium it cannot form a hardness scale in dishwashing equipment or on glassware nor can a curd be formed by the action of calcium or magnesium with soaps. Furthermore, since the deionized water contains no minerals of any kind it cannot leave "water spots" on dishes or glassware. While use of deionized water for washing and rinsing dishes is generally preferable to the use of merely softened water, there are several disadvantages connected therewith. Thus, etching of glassware is encountered as in the case of softened water. Deionization processes are considerably more complicated and complex than mere water softening; deionization usually involves the use of two ion exchange tanks instead of just one so the equipment cost is at least twice as great. Deionization requires an acid such as hydrochloric or sulfuric acid and sodium hydroxide as regenerants and of course these chemicals are considerably more expensive than the sodium chloride regenerant used in water softeners. Deionization equipment is usually two or three times as large as a conventional water softener and space limitations often preclude use of such equipment in connection with dishwashing operations. Because of the complexity of the deionization equipment and the use of hazardous chemicals, deionization processes require skilled personnel for operation. Thus, while conventional water deionization processes generally produce a better quality water for use in dishwashing operations as compared with mere water softening, these methods do have serious disadvantages.

While considerable attention has been directed toward the effect in diswashing of water containing calcium and magensius ions, very little is known about the effect of other ions that may be present in the water. Specifically, I have found that the bicarbonate ($HCO_3^-$), carbonate ($CO_3^=$), and hydroxide ($OH^-$) anions are a major cause of "water spotting" and "filming" on dishware. Tests have shown that equal weights of sodium bicarbonate, sodium carbonate, or sodium hydroxide in aqueous solution will produce considerably more spotting and filming on dishware than other sodium salts such as sodium sulfate and sodium chloride. In one such test, solutions containing 1000 parts per million of various sodium salts together with 100 parts per million of a rinse aid were compared. The solutions were heated to boiling and glass slides were dipped into these solutions for 30 seconds and then allowed to air-dry. The degree of filming was rated visually as shown below:

TABLE I

| Solution | Solution conc. | | pH | Degree of filming |
|---|---|---|---|---|
| | P.p.m. | Normality | | |
| $H_2O$ | | | 7.1 | [1] Least |
| NaCl | 1,000 | 0.017 | 6.9 | |
| $Na_2SO_4$ | 1,000 | 0.014 | 6.9 | |
| $NaHCO_3$ | 1,000 | 0.012 | 8.3 | |
| $NaCO_3$ | 1,000 | 0.019 | 10.8 | |
| NaOH | 1,000 | 0.025 | 11.8 | Most |

[1] Order of increasing filming.

It is thus desirable to maintain the bicarbonate, carbonate, and hydroxide content of water used in dishwashing operations as low as possible to prevent spotting and filming. The three anions of bicarbonate, carbonate, and hydroxide are commonly referred to as alkalinity. One method of reducing the alkaline content of water is by the addition of an acid such as hydrochloric acid. The acid will react with the alkaline anions to form sodium chloride and water. Carbon dioxide is released with the carbonate and bicarbonate salts but not with the hydroxide. This method of treatment can be illustrated by the following reactions:

$$NaHCO_3 + HCl \rightarrow NaCl + H_2O + CO_2$$

$$Na_2CO_3 + 2HCl \rightarrow 2NaCl + H_2O + CO_2$$

$$NaOH + HCl \rightarrow NaCl + H_2O$$

Another method of reducing the alkaline salt content of water is by the use of a strong acid cation exchange resin. In this known method, generally referred to as dealkalization, the hydrogen form of a strong acid cation exchange resin (HR) is used. All of the metallic cations are removed from solution and replaced by hydrogen ions. This converts the anions into their acid form (HX) according to the equaton:

$$HR + MX \rightarrow MR + HX$$

By dealkalization in this manner the carbonate, bicarbonate and hydroxide alkalinity of the water is reduced to practically zero and all other ions in the solution are converted into free acid forms. The pH of the treated water is dependent upon the quantity and quality of minerals in the raw water; the greater the non-alkaline salt content of the water the lower the resulting pH. By this process the pH of treated water is reduced to as low as 1 to 2. Such low pH water is extremely corrosive and unsuitable for use in automatic dishwashers.

Dealkalization can also be acomplished by use of an anion exchange resin in the chloride form. This reatcion can be represented as follows:

$$RCl + NaHCO_3 \rightarrow RHCO_3 + NaCl$$

where RCl represents the chloride form of an anion exchange resin. This method has several drawbacks. First, anion exchange resins are much more susceptible to degradation than are cation exchange resins. For example, cation resins have a maximum operating temperature of approximately 250° F. whereas anion exchange resins are limited to an operating temperature of about 140–170° F. Secondly, anion exchange resins become contaminated by suspended matter in water much more readily than cation exchange resins. Also, this chloride exchange method of dealkalizing water does not substantially reduce the dissolved solids content of the water; all of the anions being converted into chlorides and remaining in solution.

It is a principal object of this invention to provide a simple, convenient and advantageous method for conditioning water.

A further object of the invention is to provide a process for conditioning water for use in dishwashing operations.

It is a still further object of the invention to provide a water conditioning process which possesses significant advantages over known water treating processes.

It is a still further object of the invention to provide a process for conditioning water for use in dishwashing operations so as to achieve significant reduction in water spotting, filming and etching of glass and dishware.

In accordance with this invention water is conditioned to remove impurities therefrom by treating the water with a weakly acidic cation exchange resin. The water is passed through a single bed of the weakly acidic cation exchanger with the result that the effluent water has a reduced solids content (TDS) and is less alkaline. Conditioning of the water can be accomplished at any temperature but generally higher temperatures enhance the effectiveness. Preferably the water to be treated is passed through the cation exchanger at an elevated temperature of from about 160 to 200° F.

The cation exchange resins employed in accordance with this invention are solid weakly acidic cation exchangers in hydrogen form containing carboxylic acid groups in the molecule. Cation exchange resins having $pK_a$ values of about 3 or lower are considered strongly acidic resins. Cation exchange resins having $pK_a$ values of 3 to 4 are considered moderately strong acidic resins. Cation exchange resins having $pK_a$ values above 4 are considered weakly acidic resins and are employed in accordance with this invention. Weakly acidic cation exchange resins are disclosed in U.S. Patent No. 3,156,644. Such weakly acidic cation exchange resins are known in the art and are, for example, commercially available under the tradenames of Amberlite IRC–50 (Rohm and Haas Co.), Amberlite IRC–84 (Rohm and Haas Co.), Duolite ES–80 (Diamond Alkali Company) and Dowex CCR–1 (Dow Chemical Company). Such weakly acidic cation exchange resins contain carboxylic acid functionality within an insoluble, infusible matrix such as a cross-linked acrylic matrix or a cross-linked polystyrene or phenoyl-formaldehyde condensate.

One weakly acidic cation exchanger which is particularly preferred for use in accordance with this invention is Amberlite IRC–84. This resin is a polyacrylic acid cross-linked with divinylbenzene. It can be prepared by suspension copolymerizing a mixture of polyacrylic acid and about 3 to 10% divinylbenzene. This cation exchanger, having a $pK_a$ value of approximately 5.3, is available in hydrogen form. It has the ability to selectively split alkaline salts, that is, the resin will exchange calcium, magnesium and sodium ions from solution. However, it will only remove those cations that are associated with alkaline anions such as carbonate, bicarbonates and hydroxyl ions. Thus, for example, if a solution containing the salts sodium chloride, sodium bicarbonate, sodium carbonate, sodium sulfate and sodium hydroxide were passed through a column of the Amberlite IRC–84 resin in the hydrogen form (HR), the following reactions would occur:

$$\begin{matrix} NaCl \\ NaHCO_3 \\ Na_2CO_3 \\ Na_2SO_4 \\ NaOH \end{matrix} + HR \longrightarrow \begin{matrix} NaCl \\ H_2CO_3 \\ H_2CO_3 \\ Na_2SO_4 \\ HOH \end{matrix} + NaR$$

From the above it is seen that the alkaline salts sodium carbonate, sodium bicarbonate and sodium hydroxide react with the resin whereas the neutral salts sodium chloride and sodium sulfate pass through the cation exchanger unchanged. The ion exchange capacity of Amberlite IRC–84 is approximately 70,000 grains per cubic foot of resin. Moreover, because the resin has a strong preference for acid, only about 100 to 110% of the theoretical amount of an acid such as hydrochloric acid need be used for regeneration in contrast to the 200–300% of the theoretical quantity of acid which must be used to regenerate strongly acidic cation exchange resins.

The following examples illustrate the the advantages of the present invention.

EXAMPLE I

A single resin deionizer unit was installed on the final rinse line of a Blakeslee EC-4 commercial dishwashing machine. The deionizer unit consisted of a stainless steel tank having a diameter of 11 inches and a height of 19 inches and a capacity of approximately 7 gallons. Into each deionizer unit was placed 0.66 cubic feet (5.0 gallons) of Amberlite IRC-84 resin. A distributor was fitted into the top opening of the tank in such a way that the raw water entering the tank flowed down through the bed of the ion exchange resin, passed through a slotted tube and then out of the deionizer. The temperature of the final rinse water entering the deionizer was approximately 175–185° F. A comparison of the raw water with the treated water was as follows:

|  | Raw water | Treated water |
| --- | --- | --- |
| Total dissolved solids (p.p.m.) | 260 | 69 |
| Hardness (p.p.m.) | 256 | 30 |
| Alkalinity (p.p.m.) | 234 | 0 |
| Chlorides (p.p.m.) | 15 | 15 |
| pH | 7.9 | 5.0 |

The deionizer was regenerated at 80 day intervals using hydrochloric acid and it conditioned approximately 4,400 gallons of water during the period.

Glasses which were washed and rinsed in raw water had an average reading of 7.1 "glass units." Glasses which were washed in raw water but rinsed in the treated water which had passed through the deionizer had an average reading of 4.8 glass units.

A "glass unit" is a measure of the amount of filming and spotting on glasses. Glasses are rated on a scale from zero to 15. Four standard glasses are used in evaluation. Glasses having a zero rating are perfectly clean and free from spots and film. Glasses having a rating of 15 are very badly filmed. The other two standard glasses lie between these extremes and are given ratings of 5 and 10 glass units, respectively.

EXAMPLE II

A single resin deionizer unit as described in Example I was installed on the final rinse line of a Hobart C-44 commercial dishwashing machine. The temperature of the final rinse water employed was approximately 180° F. A comparison of the raw rinse water with the treated water which passed through the deionizer was as follows:

|  | Raw water | Treated water |
| --- | --- | --- |
| Total dissolved solids (p.p.m.) | 330 | 50 |
| Hardness (p.p.m.) | 260 | 35 |
| Alkalinity (p.p.m.) | 270 | 10 |
| pH | 7.9 | 6.0 |

The deionizer was regenerated at 20 day intervals and it conditioned about 3,000 gallons of water between regenerations.

Glasses washed and rinsed in raw water had an average reading of 9.5 glass units whereas glasses washed in raw water and rinsed in the treated water had an average reading of 3.0 glass units.

EXAMPLE III

A single resin deionizer unit as described in Example I was installed on the final rinse line of a Hobart XM commercial dishwashing machine. The temperature of the final rinse water was approximately 190° F. A comparison of the raw water and the treated water is as follows:

|  | Raw water | Treated water |
| --- | --- | --- |
| Total dissolved solids (p.p.m.) | 380 | 60 |
| Hardness (p.p.m.) | 280 | 30 |
| Alkalinity (p.p.m.) | 280 | 20 |
| pH | 7.7 | 5.5 |

The deionizer unit was regenerated at 52 day intervals after treating approximately 2,340 gallons of water. Glasses washed and rinsed in raw water had an average reading of 7.5 glass units whereas when the glasses were washed in raw water but rinsed in treated water, the average reading was upward to 4.0 glass units.

The significant improvement in water treated in accordance with the invention is apparent from the above. By passing raw water through a single bed of the weakly acidic cation exchanger the total dissolved solids content, the hardness and alkalinity of the water was greatly reduced. Glassware rinsed with the treated water exhibited much less filming and spotting as compared with glassware rinsed with raw water. It will be noted that the pH of the treated water was not drastically lowered so as to render the water corrosive to the dishwashing equipment.

Moreover, while treatment of the water by the single weakly acidic cation exchanger reduced considerably the hardness content thereof, the treatment did not remove all hardness so as to produce an extremely softened water. This is important from the standpoint of reducing the etching phenomenon as discussed previously. Studies made by me show that softened water aggravates the etching of glassware. One such study involved washing glasses in an automatic dishwasher which was equipped with a conventional water softening unit containing an ion exchange resin in sodium form. Glasses were repeatedly washed in this machine for 20 complete cycles. Then the conventional water softening resin was replaced by the Amberlite IRC-84 resin in the hydrogen form and another set of glasses washed for 20 complete cycles. After 20 cycles both sets of glasses exhibited some etching but the glasses washed with the softened water were noticeably worse than those washed in the water treated in accordance with this invention. Moreover, the glasses washed in the conventionally softened water showed more spotting and filming and were not as clean as the other set of glasses.

The use of weakly acidic cation exchange resins for conditioning water used in dishwashing operations is uniquely advantageous. The method of the present invention possesses a number of advantages over other methods of conditioning water. The high exchange capacity and efficiency of regeneration of these exchangers provide definite economic advantages as compared with conventional dealkalization or deionization processes. The selective splitting of only alkaline salts by these resins is a significant improvement over strong acid ion exchange dealkalization processes because the treated water is not highly acidic and corrosive to equipment. The fact that these exchangers do not remove all hardness from water makes the process more suitable than conventional water softening treatments for use in connection with dishwashing. Only a single bed of the weakly acidic cation exchangers is required thereby minimizing equipment and space requirements.

Throughout this application the term dishwashing is used in its broad sense to include pre-rinsing, washing and final rinsing steps and includes all tableware and utensils employed for food preparation.

Those modifications and equivalents which fall within the spirit of the invention and the scope of the appended claims are to be considered part of the invention.

I claim:

1. In a process of dishwashing the improvement which consists in employing therein water which has been treated with a weakly acidic cation exchange resin in hydrogen form having a $pK_a$ value above 4, the treated water having a dissolved solids content of not less than about 50 p.p.m. and a pH of about 5.0 to 6.0.

2. A process in accordance with claim 1 wherein the water is treated with a weakly acidic cation exchange resin at a temperature of from about 160° F. to 200° F.

References Cited

UNITED STATES PATENTS 3,087,504 4/1963 Geschka _____ 210—190 X
3,336,747 8/1967 Applebaum et al. ___ 210—38 X SAMIH N. ZAHARNA, Primary Examiner U.S. Cl. X.R.

134—13; 210—38